US012436559B2

(12) United States Patent
Nishigaki

(10) Patent No.: US 12,436,559 B2
(45) Date of Patent: Oct. 7, 2025

(54) MEDICAL CONTROL DEVICE AND MEDICAL OBSERVATION SYSTEM

(71) Applicant: Sony Olympus Medical Solutions Inc., Tokyo (JP)

(72) Inventor: Yasuhiro Nishigaki, Tokyo (JP)

(73) Assignee: Sony Olympus Medical Solutions Inc., Tokyo (JP)

( * ) Notice: Subject to any disclaimer, the term of this patent is extended or adjusted under 35 U.S.C. 154(b) by 81 days.

(21) Appl. No.: 18/174,665

(22) Filed: Feb. 27, 2023

(65) Prior Publication Data
US 2023/0280783 A1 Sep. 7, 2023

(30) Foreign Application Priority Data

Mar. 3, 2022 (JP) ................................. 2022-032896

(51) Int. Cl.
*G06F 1/12* (2006.01)
*G06F 1/06* (2006.01)
*G06F 1/08* (2006.01)

(52) U.S. Cl.
CPC ................ *G06F 1/12* (2013.01); *G06F 1/06* (2013.01); *G06F 1/08* (2013.01)

(58) Field of Classification Search
CPC ..... G06F 1/04; G06F 1/06; G06F 1/08; G06F 1/12; A61B 1/00004; A61B 1/00006; A61B 1/00009; A61B 1/00087; A61B 1/045
See application file for complete search history.

(56) References Cited

U.S. PATENT DOCUMENTS

| 2012/0320175 | A1* | 12/2012 | Takizawa | A61B 1/00009 |
| | | | | 348/E5.011 |
| 2018/0091159 | A1* | 3/2018 | Tsutsumi | H03K 5/135 |
| 2018/0091160 | A1* | 3/2018 | Tsutsumi | H03L 7/0816 |
| 2019/0285870 | A1* | 9/2019 | Adachi | A61B 1/045 |
| 2021/0014448 | A1* | 1/2021 | Kato | A61B 1/05 |
| 2022/0387115 | A1* | 12/2022 | Barbagli | G06T 7/50 |
| 2023/0110161 | A1* | 4/2023 | Nadeau-Dostie | G06F 1/12 |
| | | | | 713/401 |

FOREIGN PATENT DOCUMENTS

| JP | 2014-110843 A | 6/2014 |
| JP | 2015-134039 A | 7/2015 |

* cited by examiner

*Primary Examiner* — Thomas J. Cleary
(74) *Attorney, Agent, or Firm* — XSENSUS LLP

(57) ABSTRACT

A medical control device includes: a first clock generation unit configured to generate a first clock; a first synchronization signal generation unit configured to generate a first synchronization signal based on the first clock; a second clock generation unit configured to generate a second clock; and a second synchronization signal generation unit configured to generate a second synchronization signal for operating the medical observation device based on the first synchronization signal and the second clock, wherein the second synchronization signal generation unit is configured to individually execute: a first setting process of setting a transition timing; and a second setting process of setting a transition timing.

20 Claims, 6 Drawing Sheets

MEDICAL CONTROL DEVICE AND MEDICAL OBSERVATION SYSTEM

This application claims priority from Japanese Application No. 2022-032896, filed on Mar. 3, 2022, the contents of which are incorporated by reference herein in its entirety.

BACKGROUND

The present disclosure relates to a medical control device and a medical observation system.

In the medical field, there has been known a medical observation system that observes the inside of a subject (inside of a living body) (refer to JP 2015-134039 A, for example).

The medical observation system described in JP 2015-134039 A includes: a camera head (medical observation device) that captures a subject image to generate a captured image; and a control device (medical control device) that controls an operation of the medical observation device.

A conceivable configuration of the medical control device that generates a synchronization signal for operating the medical observation device is the following. FIG. 8 is a diagram illustrating a configuration of a medical control device 200 that generates a synchronization signal for operating a medical observation device 100 of a known technique.

As illustrated in FIG. 8, the medical control device 200 includes a first clock generation unit 210, a first synchronization signal generation unit 220, a second clock generation unit 230, and a second synchronization signal generation unit 240.

The first clock generation unit 210 generates a first clock.

Based on the first clock, the first synchronization signal generation unit 220 generates a first synchronization signal which is a master synchronization signal for operating the entire medical observation system. Incidentally, there are various types of medical observation devices 100 constituting a medical observation system 300. In order to cope with the various types, it is necessary to generate, from the first synchronization signal, a second synchronization signal corresponding to the medical observation device 100 connected to the medical control device as a synchronization signal for operating the medical observation device 100. Accordingly, the second clock generation unit 230 and the second synchronization signal generation unit 240 are provided.

The second clock generation unit 230 generates a second clock.

The second synchronization signal generation unit 240 generates a second synchronization signal based on the first synchronization signal and the second clock, and outputs the generated second synchronization signal to the medical observation device 100.

Here, the first and second clocks have mutually different phases. Therefore, in a case where the second synchronization signal is generated by simply switching the first synchronization signal by the second clock, metastability might occur.

There is a proposed technique to suppress the occurrence of metastability, including a configuration in which phase compensation is applied on the clocks having phases different from each other (refer to JP 2014-110843 A, for example).

The technique described in JP 2014-110843 A has a configuration to perform phase compensation on a clock on the data transmitter side that transmits data and a clock on the data receiver side that receives the data.

Specifically, the technique described in JP 2014-110843 A includes: a control circuit that requests a data transmitter to transmit specific data (initial clock data); and a phase locked loop (PLL) circuit that locks a phase by the initial clock data on the data receiver side, thereby performing phase compensation on the clocks having mutually different phases.

SUMMARY

In a case where the technique described in JP 2014-110843 A is applied to the conventional configuration illustrated in FIG. 8, there is a need to provide the control circuit and the PLL circuit described in JP 2014-110843 A on the second synchronization signal generation unit 240 side, which causes a problem of a complicated structure.

To handle this, there is a demand for a technique capable of suppressing the occurrence of metastability with a simple configuration.

According to one aspect of the present disclosure, there is provided a medical control device including: a first clock generation unit configured to generate a first clock; a first synchronization signal generation unit configured to generate a first synchronization signal based on the first clock; a second clock generation unit configured to generate a second clock; and a second synchronization signal generation unit configured to generate a second synchronization signal for operating the medical observation device based on the first synchronization signal and the second clock, wherein the second synchronization signal generation unit is configured to individually execute: a first setting process of setting a transition timing at which the second synchronization signal transitions in correspondence with a transition of the first synchronization signal at a first transition timing, being an initial timing, of the input first synchronization signal; and a second setting process of setting a transition timing at which the second synchronization signal transitions in correspondence with a transition of the first synchronization signal at a second transition timing, being a second or subsequent timing, of the first synchronization signal, the first setting process performs setting of a transition timing at which the second synchronization signal transitions in correspondence with the transition of the first synchronization signal at the first transition timing by switching the first transition timing to a transition timing of the second clock, and the second setting process performs setting of a transition timing at which the second synchronization signal transitions in correspondence with the transition of the first synchronization signal at the second transition timing based on a position on a time axis of the second transition timing.

DETAILED DESCRIPTION

Figure 1:
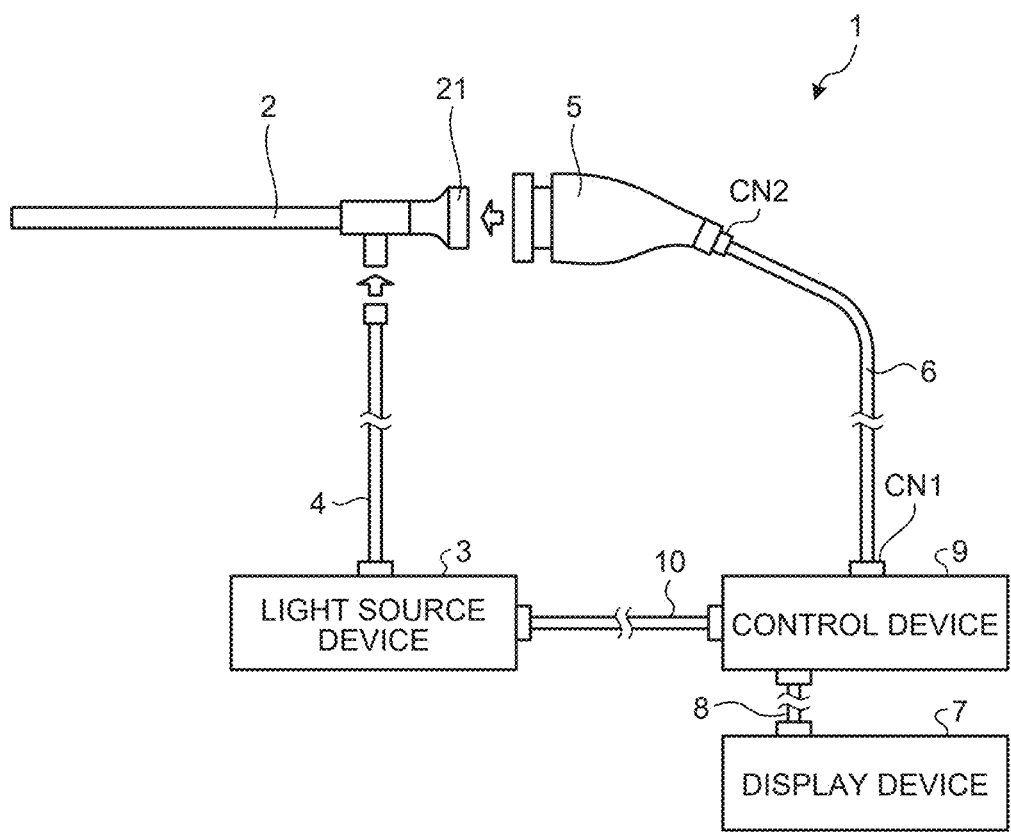
FIG. 1 is a diagram illustrating a medical observation system according to an embodiment.

Hereinafter, modes for carrying out the present disclosure (hereinafter referred to as embodiments) will be described with reference to the drawings. Note that the present disclosure is not limited to the embodiments described below. In the drawings, same reference signs are attached to the same components.

Schematic Configuration of Medical Observation System

FIG. 1 is a diagram illustrating a configuration of a medical observation system 1 according to an embodiment.

The medical observation system 1 is a system that is used in the medical field and observes the inside of a subject (living body). As illustrated in FIG. 1, the medical observation system 1 includes an insertion unit 2, a light source device 3, a light guide 4, a camera head 5, a first transmission cable 6, a display device 7, a second transmission cable 8, a control device 9, and a third transmission cable 10.

In the present embodiment, the insertion unit 2 is implemented by a rigid endoscope. That is, the insertion unit 2 has an elongated shape that is entirely rigid, or partially rigid with a partially flexible portion, so as to be inserted into a living body. The insertion unit 2 includes an optical system (not illustrated) having one or more lenses and configured to collect light (subject image) from the living body.

The light source device 3 is connected to one end of the light guide 4, and supplies illumination light of a light amount designated by the control device 9 to the one end of the light guide 4 under the control of the control device 9. In the present embodiment, the light source device 3 is separated from the control device 9. However, the configuration is not limited to this, and it is allowable to employ a configuration in which the light source device 3 is provided inside the control device 9.

The light guide 4 has one end detachably connected to the light source device 3 and the other end detachably connected to the insertion unit 2. The light guide 4 transmits the light supplied from the light source device 3 from one end to the other end and supplies the light to the insertion unit 2. The light supplied to the insertion unit 2 is emitted from a distal end of the insertion unit 2 and directed into the living body. The light (subject image) applied to internal portions of the living body is condensed by the optical system in the insertion unit 2.

The camera head 5 corresponds to a medical observation device according to the present disclosure. The camera head 5 is detachably connected to an eyepiece 21 of the insertion unit 2. In addition, the camera head 5 includes an imaging unit 51 (refer to FIG. 2) that captures a subject image condensed by the insertion unit 2 and generates an image signal (hereinafter, referred to as a captured image) under the control of the control device 9. The imaging unit 51 includes: an image sensor (not illustrated) such as a charge coupled device (CCD) or a complementary metal oxide semiconductor (CMOS) that receives the subject image condensed by the insertion unit 2 and converts the subject image into an electric signal (analog signal); and a signal processing unit (not illustrated) that performs signal processing on the captured image of the analog signal generated by the image sensor and outputs the captured image of a digital signal.

The first transmission cable 6 has one end detachably connected to the control device 9 via a connector CN1 (FIG. 1), and has the other end detachably connected to the camera head 5 via a connector CN2 (FIG. 1). The first transmission cable 6 transmits the captured image or the like output from the camera head 5 to the control device 9, and transmits a control signal, a synchronization signal, a clock, power, or the like output from the control device 9 to the camera head 5 individually.

Note that the captured image or the like transmitted from the camera head 5 to the control device 9 via the first transmission cable 6 may be transmitted in an optical signal or in an electrical signal. The similar applies to transmission of the control signal, the synchronization signal, and the clock from the control device 9 to the camera head 5 via the first transmission cable 6.

The display device 7 is implemented by a display using liquid crystal, organic Electro Luminescence (EL), or the like, and displays an image based on a video signal from the control device 9 under the control of the control device 9.

The second transmission cable 8 has one end detachably connected to the display device 7 and the other end detachably connected to the control device 9. The second transmission cable 8 transmits the video signal processed by the control device 9 to the display device 7.

The control device 9 corresponds to the medical control device according to the present disclosure. The control device 9 is implemented by a central processing unit (CPU), a Field-Programmable Gate Array (FPGA), or the like, and comprehensively controls operation of the light source device 3, the camera head 5, and the display device 7.

A detailed configuration of the control device 9 will be described in "Configuration of control device" described below.

The third transmission cable 10 has one end detachably connected to the light source device 3 and the other end detachably connected to the control device 9. The third transmission cable 10 transmits the control signal from the control device 9 to the light source device 3.

Configuration of Control Device

Next, a configuration of the control device 9 will be described.

Figure 2:
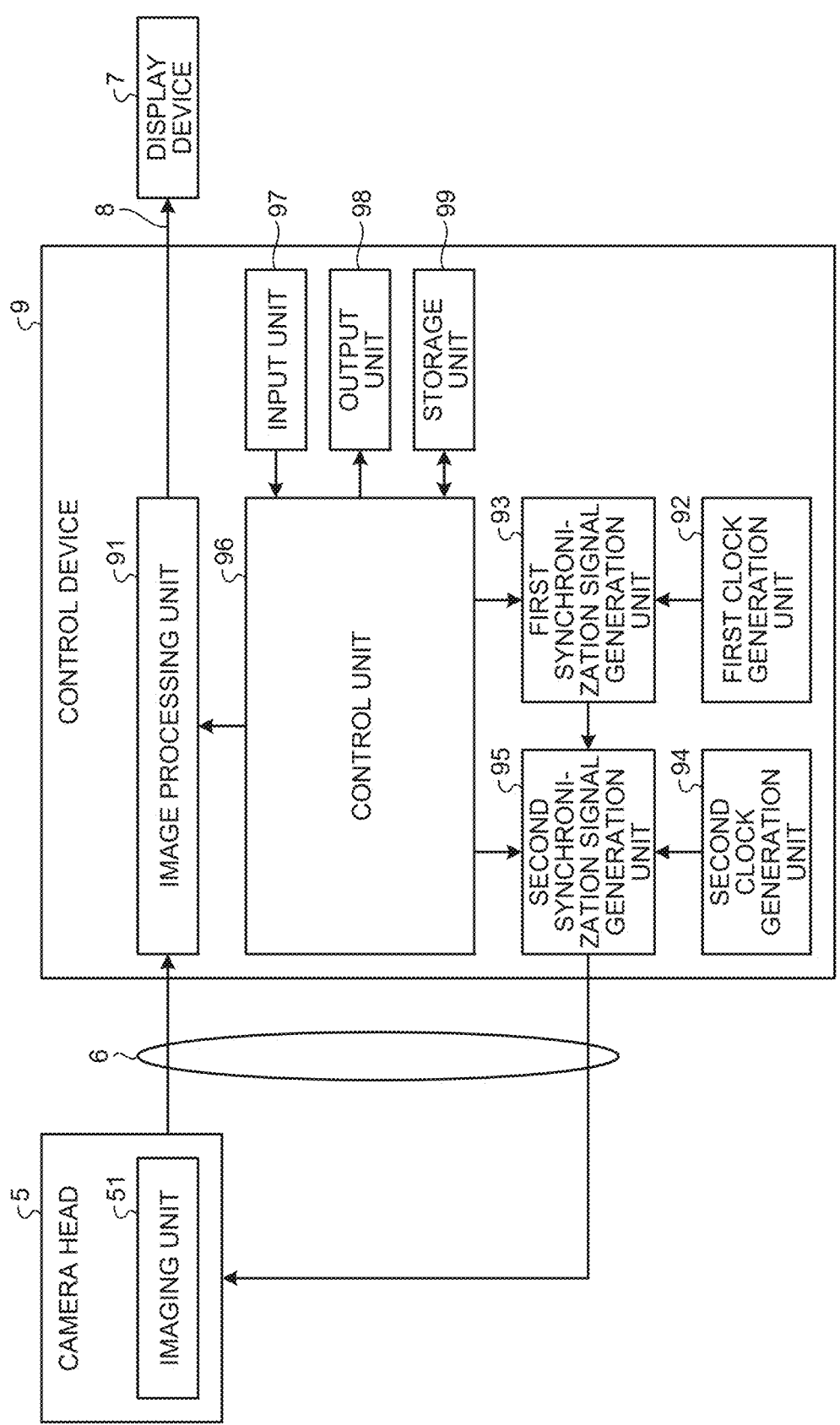
FIG. 2 is a block diagram illustrating a configuration of a control device.

FIG. 2 is a block diagram illustrating a configuration of the control device 9.

As illustrated in FIG. 2, the control device 9 includes an image processing unit 91, a first clock generation unit 92, a first synchronization signal generation unit 93, a second clock generation unit 94, a second synchronization signal generation unit 95, a control unit 96, an input unit 97, an output unit 98, and a storage unit 99.

Under the control of the control unit 96, the image processing unit 91 executes image processing on the captured image (digital signal) output from the camera head 5 and generates a video signal for display used for displaying the captured image. Subsequently, image processing unit 91 outputs the video signal to the display device 7. With this operation, the captured image is displayed on the display device 7.

Specific examples of the image processing include optical black subtraction processing, demosaic processing, white balance adjustment processing, noise reduction processing, color correction processing, color enhancement processing, and contour enhancement processing.

The first clock generation unit 92 is also referred to as a clock generator and generates a first clock.

Under the control of the control unit 96, the first synchronization signal generation unit 93 generates a first synchronization signal used for the entire operation of the control device 9 based on the first clock.

The second clock generation unit 94 is also referred to as a clock generator, and generates a second clock having a phase and a frequency different from those of the first clock.

Under the control of the control unit 96, the second synchronization signal generation unit 95 generates a second synchronization signal for operating the camera head 5 (the imaging unit 51 or the like) based on the first synchronization signal and the second clock.

Here, the second synchronization signal generation unit 95 performs a first setting process and a second setting process individually.

Note that details of the first setting process will be described in "First setting process" described below. Details of the second setting process will be described in "Second setting process" described below.

The control unit 96 is implemented by executing various programs stored in the storage unit 99 by a controller such as a CPU or a micro processing unit (MPU). The control unit 96 controls the operations of the light source device 3, the camera head 5, and the display device 7 and controls the entire operation of the control device 9. The control unit 96 may be constituted with an integrated circuit such as an application specific integrated circuit (ASIC) or an FPGA, not limited to the CPU or the MPU. The control unit 96 has functions of a motion detector and a time width changer according to the present disclosure. The function will be described in "Second setting process" described below.

The input unit 97 is constituted with an operation device such as a mouse, a keyboard, and a touch panel, and receives user operations performed by a user such as a doctor. Subsequently, the input unit 97 outputs an operation signal corresponding to the user operation to the control unit 96.

The output unit 98 is constituted with a speaker, a printer, or the like, and outputs various types of information.

The storage unit 99 stores a program executed by the control unit 96, information needed for processing performed by the control unit 96, or the like.

First Setting Process

Next, a first setting process executed by the second synchronization signal generation unit 95 will be described.

Figure 3:
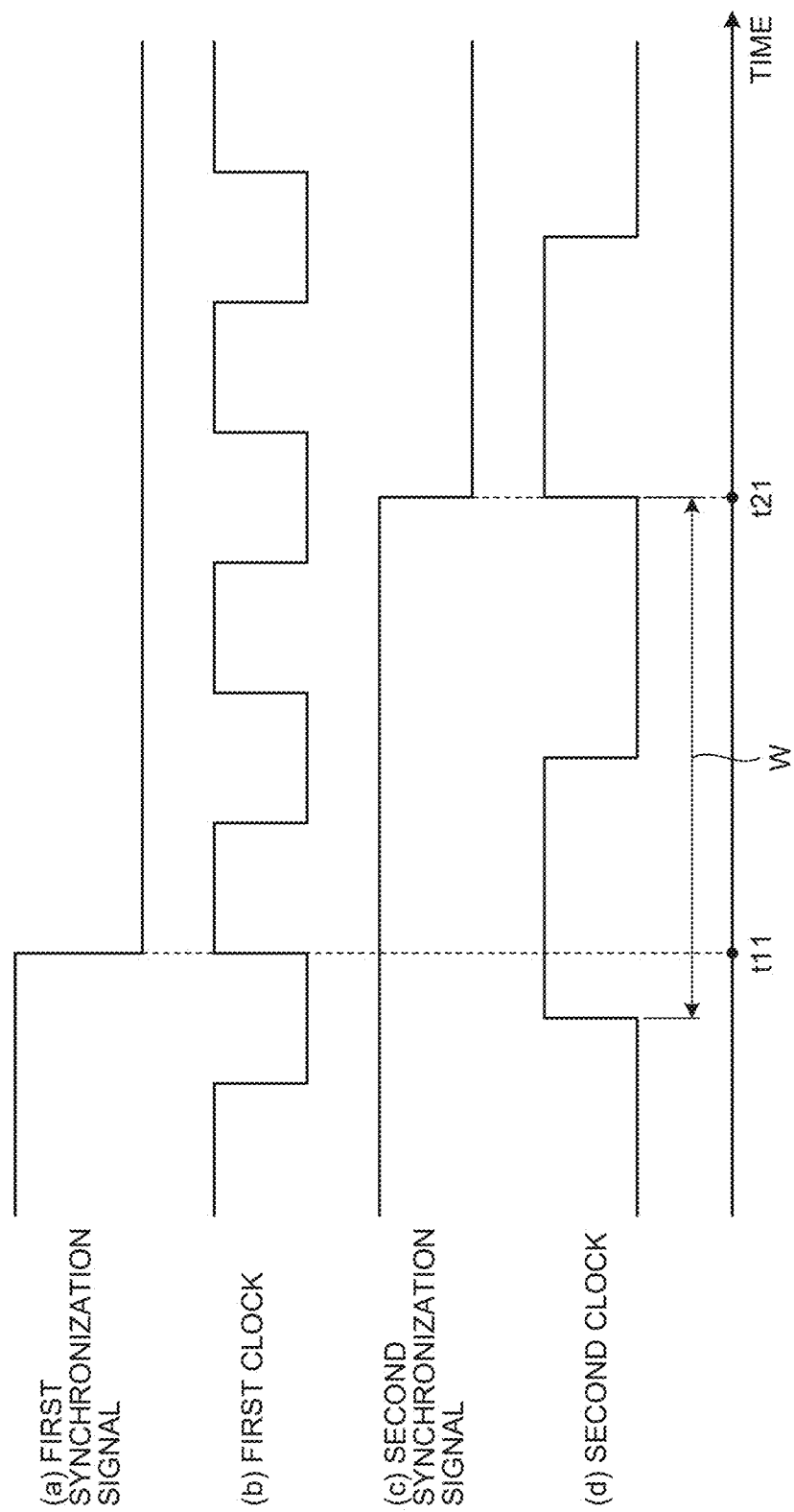
FIG. 3 is a diagram illustrating a specific example of a first setting process.

FIG. 3 is a diagram illustrating a specific example of the first setting process. Here, (a) of FIG. 3 illustrates the first synchronization signal. (b) of FIG. 3 illustrates the first clock. (c) of FIG. 3 illustrates the second synchronization signal. (d) of FIG. 3 illustrates the second clock.

The second synchronization signal generation unit 95 performs the first setting process of setting a transition timing at which the second synchronization signal transitions in correspondence with the transition of the first synchronization signal at a first transition timing, being an initial timing, of the input first synchronization signal (similarly to the transition of the first synchronization signal).

The transition timing represents a rising timing at which the signal (including first and second synchronization signals and first and second clocks) transitions from a low level to a high level or a falling timing at which the signal transitions from a high level to a low level.

As described above, the first and second clocks have a difference in phases and frequencies. Therefore, the second synchronization signal generation unit 95 may not set the transition timing at which the second synchronization signal transitions in correspondence with the transition of the first synchronization signal at a first transition timing t11, being an initial timing (FIG. 3), of the input first synchronization signal, to the same timing as the first transition timing t11.

Subsequently, in the first setting process, as illustrated in FIG. 3, by switching the first transition timing t11 to a transition timing t21 of the second clock, the second synchronization signal generation unit 95 sets the transition timing at which the second synchronization signal transitions (falls) in correspondence with the transition (falling) of the first synchronization signal at the first transition timing t11. That is, the rise timing t21 immediately after the first transition timing t11 in the second clock is set as the transition timing at which the second synchronization signal transitions in correspondence with the transition of the first synchronization signal at the first transition timing t11.

Second Setting Process

Next, a second setting process executed by the second synchronization signal generation unit 95 will be described.

The second synchronization signal generation unit 95 performs the second setting process of setting a transition timing at which the second synchronization signal transitions in correspondence with the transition of the first synchronization signal at the second transition timing, being a second or subsequent timing, of the input first synchronization signal (similarly to the transition of the first synchronization signal).

Specifically, in the second setting process, the second synchronization signal generation unit 95 sets the transition timing at which the second synchronization signal transitions in correspondence with the transition of the first synchronization signal at the second transition timing based on the position on a time axis of the second transition timing. More specifically, in the second setting process, the second synchronization signal generation unit 95 determines whether the position of the second transition timing on the time axis is located within a specific time width W (refer to FIGS. 4 to 7) centered on the reference timing t0 (t01, t02, (refer to FIGS. 4 to 7)) corresponding to the cycle of the first synchronization signal, and based on the determination result, sets the transition timing at which the second synchronization signal transitions in correspondence with the transition of the first synchronization signal at the second transition timing.

Here, the storage unit 99 preliminarily stores a time (hereinafter, described as reference time) between the transition timings (between the rising timing and the falling timing) in the first synchronization signal, and a specific time width W. The second synchronization signal generation unit 95 sets each timing at which the reference time stored in the storage unit 99 has elapsed from the first transition timing t11, as reference timing t0 (t01, t02, . . . ) corresponding to the cycle of the first synchronization signal.

Furthermore, an example of the specific time width W may be one cycle of the second clock as illustrated in FIG. 3. Note that the specific time width W is set to be changeable by the control unit 96 in accordance with a user operation on the input unit 97. In addition, the control unit 96 changes the time width W to be used in the second setting process to a large value only in the following cases.

Specifically, the control unit 96 (motion detector) detects a motion of an energy treatment tool such as an electric scalpel or an ultrasonic treatment tool.

For example, the control unit 96 determines whether an energy treatment tool is included in a captured image by image recognition using artificial intelligence (AI). When having determined that the energy treatment tool is included in the captured image, the control unit 96 detects motions of the energy treatment tool.

Further, for example, the control device 9 is electrically connected to the energy treatment tool. In addition, the control device 9 may detect a signal corresponding to an operation of starting application of treatment energy (high-frequency energy, ultrasonic energy, etc.) to the living tissue in the energy treatment tool. When having detected a signal corresponding to the operation, the control unit 96 detects the motion of the energy treatment tool.

When having detected the motion of the energy treatment tool, the control unit 96 (time width changer) changes the specific time width W stored in the storage unit 99 to a large value.

As described above, the second synchronization signal generation unit 95 executes the second setting process, as different type of process, based on the determination result as to whether the position on the time axis of the second transition timing is positioned within the specific time width W centered on the reference timing t0 (t01, t02, . . . ). Hereinafter, the second setting process will be specifically described by dividing the determination result into cases.

Specific Example of Second Setting Process (Part 1)

Figure 4:
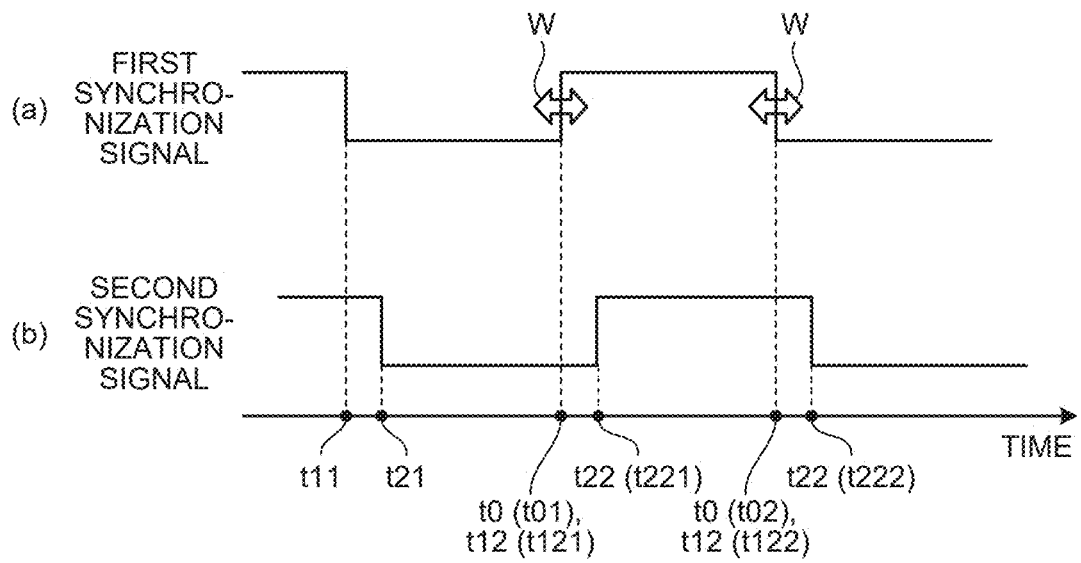
FIG. 4 is a diagram illustrating a specific example (part 1) of a second setting process.

FIG. 4 is a diagram illustrating a specific example (part 1) of the second setting process. Here, (a) of FIG. 4 illustrates the first synchronization signal. (b) of FIG. 4 illustrates the second synchronization signal. Note that FIG. 4 illustrates a case where the position on the time axis of the second transition timing t12 (t121, t122) is positioned within a specific time width W centered on the reference timing t0 (t01, t02).

First, a case where the position on the time axis of the second transition timing t12 (FIG. 4) is positioned within a specific time width W centered on the reference timing to will be described.

In this case, in the second setting process, based on the count value of the second clock counted from the transition timing immediately before the second synchronization signal, the second synchronization signal generation unit 95 sets a transition timing t22 at which the second synchronization signal transitions in correspondence with the transition of the first synchronization signal at second transition timing t12.

Specifically, in the example of FIG. 4, the position of the second transition timing t121 on the time axis is located within a specific time width W centered on the reference timing t01. Therefore, the second synchronization signal generation unit 95 sets a timing t221 at which the count value of the second clock counted from the transition timing t21 of the second synchronization signal becomes a specific count value, as a transition timing at which the second synchronization signal transitions (rises) in correspondence with the transition (rise) of the first synchronization signal at the second transition timing t121.

In the example of FIG. 4, the position on the time axis of the second transition timing t121 subsequent to the second transition timing t122 is located within a specific time width W centered on reference timing t02. Therefore, the second synchronization signal generation unit 95 sets a timing t222 at which the count value of the second clock counted from the transition timing t221 of the second synchronization signal reaches a specific count value, as a transition timing at which the second synchronization signal transitions (falls) in correspondence with the transition (falling) of the first synchronization signal at the second transition timing t122.

Specific Example of Second Setting Process (Part 2)

Figure 5:
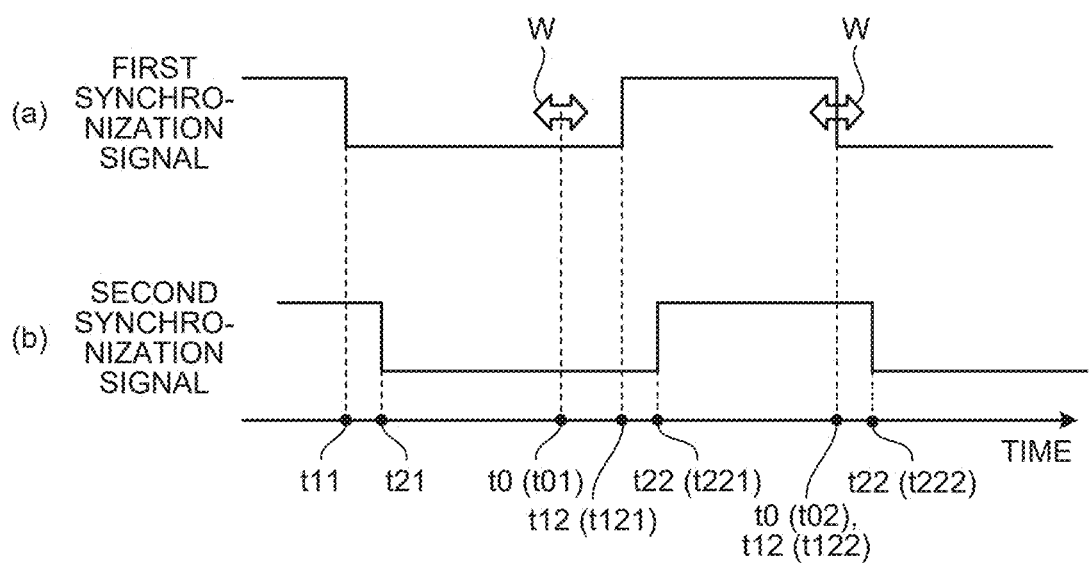
FIG. 5 is a diagram illustrating a specific example (part 2) of the second setting process.

FIG. 5 is a diagram illustrating a specific example (part 2) of the second setting process. Here, (a) of FIG. 5 illustrates the first synchronization signal. (b) of FIG. 5 illustrates the second synchronization signal. FIG. 5 illustrates a case where the position on the time axis of the second transition timing t121 is not located within a specific time width W centered on the reference timing t01, but is located after the specific time width W. Furthermore, FIG. 5 illustrates a case where the position on the time axis of the second transition timing t121 subsequent to the second transition timing t122 is positioned within a specific time width W centered on the reference timing t02.

Next, the following is a case where the position on the time axis of the second transition timing t12 is not positioned within a specific time width W centered on the reference timing t0 and is positioned after the specific time width W.

In this case, in the second setting process, similarly to the first setting process described above, the second synchronization signal generation unit 95 switches the second transition timing t12 to the transition timing of the second clock, thereby setting the transition timing t22 at which the second synchronization signal transitions in correspondence with the transition of the first synchronization signal at the second transition timing t12.

Specifically, in the example of FIG. 5, the position on the time axis of the second transition timing t121 is not positioned within a specific time width W centered on the reference timing t01, but is positioned after the time width W. Therefore, similarly to the first setting process described above, the second synchronization signal generation unit 95 sets transition timing t221 at which the second synchronization signal transitions (rises) in correspondence with the transition (rise) of the first synchronization signal at the second transition timing t121 by switching the second transition timing t121 to the transition timing of the second clock.

In the example of FIG. 5, the position on the time axis of the second transition timing t121 subsequent to the second transition timing t122 is located within a specific time width W centered on reference timing t02. Therefore, similarly to the example of FIG. 4 described above, the second synchronization signal generation unit 95 sets a timing t222 at which the count value of the second clock counted from the transition timing t221 of the second synchronization signal reaches a specific count value, as a transition timing at which the second synchronization signal transitions (falls) in correspondence with the transition (falling) of the first synchronization signal at the second transition timing t122.

Specific Example of Second Setting Process (Part 3)

Figure 6:
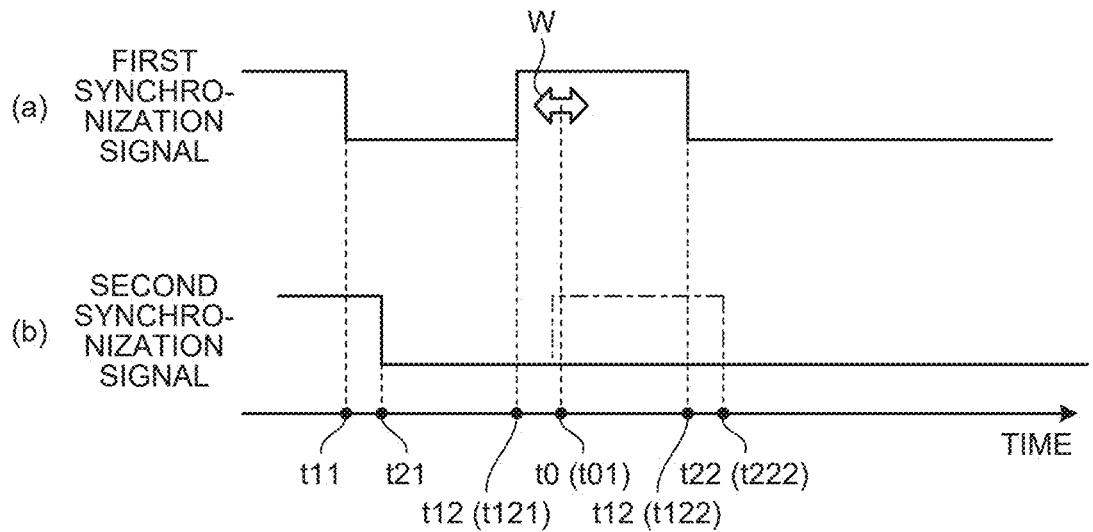
FIG. 6 is a diagram illustrating a specific example (part 3) of the second setting process.

FIG. 6 is a diagram illustrating a specific example (part 3) of the second setting process. Here, (a) of FIG. 6 illustrates the first synchronization signal. (b) of FIG. 6 illustrates the second synchronization signal. FIG. 6 illustrates a case where the position on the time axis of the second transition timing t121 is not located within a specific time width W centered on the reference timing t01, but is located before the specific time width W.

Next, the following is a case where the position on the time axis of the second transition timing t12 is not positioned within a specific time width W centered on the reference timing t0 and is positioned before the specific time width W.

In this case, in the second setting process, the second synchronization signal generation unit 95 does not transition the second synchronization signal in correspondence with the transition of the first synchronization signal at the second transition timing t12.

Specifically, in the example of FIG. 6, the position on the time axis of the second transition timing t121 is not positioned within a specific time width W centered on the reference timing t01, but is positioned before the time width W. Therefore, the second synchronization signal generation unit 95 does not transition the second synchronization signal in correspondence with the transition (rising) of the first synchronization signal at the second transition timing t121. Subsequently, similarly to the first setting process described above, the second synchronization signal generation unit 95 switches the second transition timing t122 subsequent to the second transition timing t121 to the transition timing of the second clock, thereby setting the transition timing t222 at which the second synchronization signal transitions (falls) in correspondence with the transition (fall) of the first synchronization signal at the second transition timing t122. In FIG. 6, the second synchronization signal in a case where the second synchronization signal is set to transition (rise) in correspondence with the transition (rise) of the first synchronization signal at the second transition timing t121 is represented by a one-dot chain line.

Specific Example of Second Setting Process (Part 4)

Figure 7:
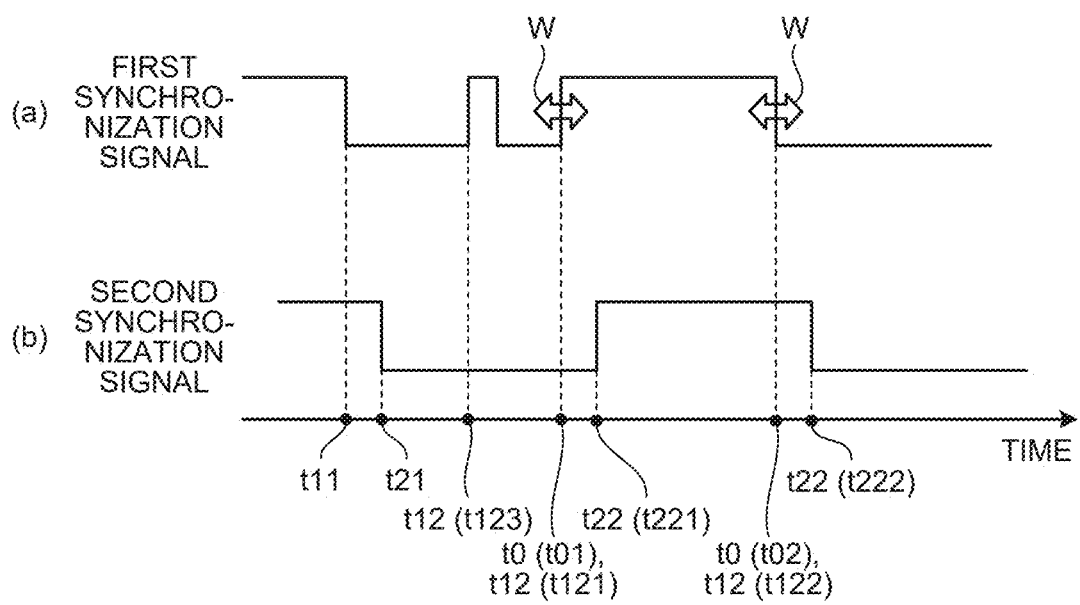
FIG. 7 is a diagram illustrating a specific example (part 4) of the second setting process.
Figure 8:
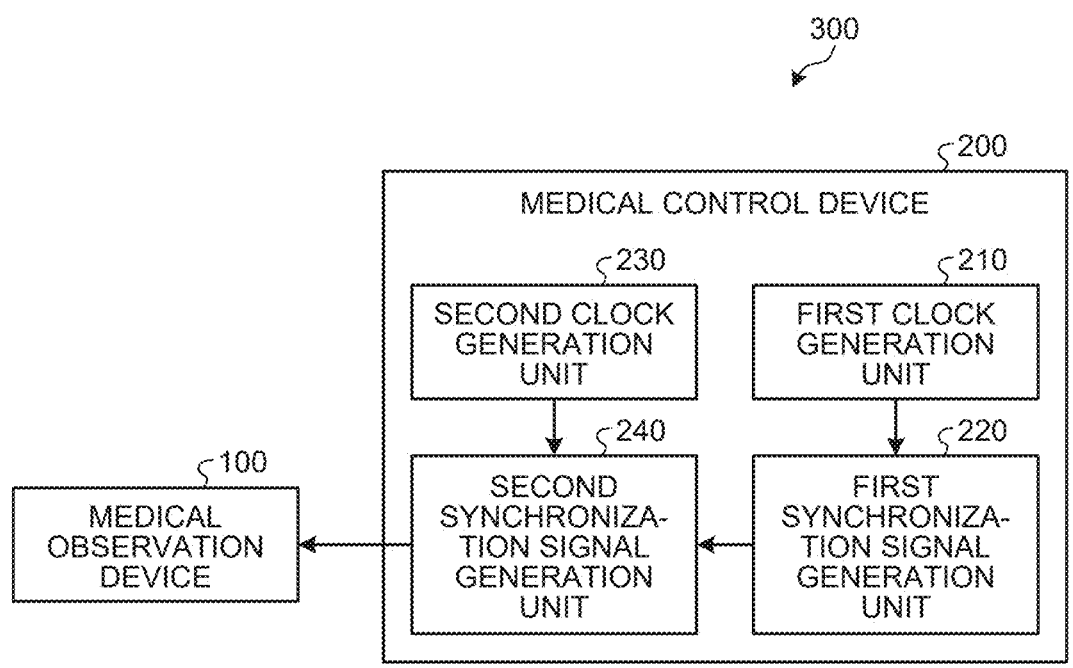
FIG. 8 is a diagram illustrating a configuration of a medical control device that generates a synchronization signal for operating a conventional medical observation device.

FIG. 7 is a diagram illustrating a specific example (part 4) of the second setting process. Here, (a) of FIG. 7 illustrates the first synchronization signal. (b) of FIG. 7 illustrates the second synchronization signal. Note that FIG. 7 illustrates a case where there is a plurality of second transition timings t12 (t121, t123), the positions on the time axis of the second transition timing t123, which is a part of the plurality of second transition timings t121 and t123, are not positioned within a specific time width W centered on the reference timing t01, but positioned before the specific time width W, while the positions on the time axis of another second transition timing t121 is positioned within the specific time width W. Furthermore, FIG. 7 and FIG. 5 illustrate a case where the position on the time axis of the second transition timing t122 subsequent to the second transition timing t121 is located within a specific time width W centered on the reference timing t02.

Next, the following is a case where there is a plurality of second transition timings t12, positions on the time axis of the second transition timing, which is a part of the plurality of second transition timings t12, is not located within a specific time width W centered on the reference timing to but located before the specific time width W, and positions on the time axis of another second transition timing is positioned within the specific time width W.

In this case, in the second setting process, based on the count value of the second clock counted from the transition timing immediately before the second synchronization signal, the second synchronization signal generation unit 95 sets a transition timing t22 at which the second synchronization signal transitions in correspondence with the transition of the first synchronization signal at second transition timing t12.

Specifically, in the example of FIG. 7, there are two second transition timings t12: second transition timings t121 and t123. The position on the time axis of one second transition timing t123 is not located within a specific time width W centered on the reference timing t01 but is located before the specific time width W. On the other hand, the position of the other second transition timing t121 on the time axis is located within a specific time width W centered on the reference timing t01. Therefore, similarly to the example of FIG. 4 described above, the second synchronization signal generation unit 95 sets a timing t221 at which the count value of the second clock counted from the transition timing t21 of the second synchronization signal reaches a specific count value, as a transition timing at which the second synchronization signal transitions (rising) in correspondence with the transition (rising) of the first synchronization signal at the second transition timing t121.

In the example of FIG. 7, the second transition timing t122 subsequent to the second transition timing t121 is located within specific a time width W centered on the reference timing t02. Therefore, similarly to the example of FIG. 4 described above, the second synchronization signal generation unit 95 sets a timing t222 at which the count value of the second clock counted from the transition timing t221 of the second synchronization signal reaches a specific count value, as a transition timing at which the second synchronization signal transitions (falls) in correspondence with the transition (falling) of the first synchronization signal at the second transition timing t122.

The present embodiment described above achieves the following effects.

In the control device 9 according to the present embodiment, the second synchronization signal generation unit 95 executes the first and second setting processes individually. The first setting process is a process of setting a transition timing at which the second synchronization signal transitions in correspondence with the transition of the first synchronization signal at the first transition timing, being the initial timing, of the input first synchronization signal. The second setting process is a process of setting a transition timing at which the second synchronization signal transitions in correspondence with the transition of the first synchronization signal at the second transition timing, being a second or subsequent timing, of the input first synchronization signal. Specifically, the second setting process is a process of determining whether the position of the second transition timing on the time axis is located within a specific time width W centered on the reference timing t0 (t01, t02, ...) corresponding to the cycle of the first synchronization signal, and setting, based on the determination result, the transition timing at which the second synchronization signal transitions in correspondence with the transition of the first synchronization signal at the second transition timing.

Therefore, with the control device 9 according to the present embodiment, there is no need to provide the control circuit or the PLL circuit described in JP 2014-110843 A on the second synchronization signal generation unit 95 side even when using the first and second clocks having no mutual phase compensation. That is, according to the control device 9, the occurrence of the metastability may be suppressed with a simple configuration.

In particular, in a case where the position on the time axis of the second transition timing t12 is not positioned within the specific time width W centered on the reference timing to but is positioned after the specific time width W, there is a possibility that the first synchronization signal is newly generated by restart or the like.

In the present embodiment, in the case described above, the second synchronization signal generation unit 95 executes the process described in the specific example (part 2) of the second setting process. This makes it possible to generate an appropriate second synchronization signal in consideration of the possibility that the first synchronization signal is newly generated by restart or the like.

Furthermore, in a case where the position on the time axis of the second transition timing t12 is not positioned within the specific time width W centered on the reference timing to but is positioned before the specific time width W, setting the transition timing of the second synchronization signal in accordance with the second transition timing t12, the display of the captured image of one frame would be interrupted.

In the present embodiment, in the case described above, the second synchronization signal generation unit 95 executes the process described in the specific example (part 3) of the second setting process. This makes it possible to display a captured image suitable for observation without interrupting a captured image in one frame.

Furthermore, there may be a case where there is a plurality of second transition timings t12, the positions on the time axis of the second transition timings t123, which is a part of the plurality of second transition timings t12, is not located within a specific time width W centered on the reference timing t01, but located before the specific time width W, while the positions on the time axis of another second transition timing t121 is positioned within the specific time width W, it is conceivable that the second transition timing t123 has been generated by disturbance of the first synchronization signal by noise.

In the present embodiment, in the case described above, the second synchronization signal generation unit 95 executes the process described in the specific example (part 4) of the second setting process. This makes it possible to generate an appropriate second synchronization signal even when the first synchronization signal is affected by noise.

Meanwhile, when the energy treatment tool is operated, the first synchronization signal is likely to be affected by noise.

In the present embodiment, when having detected the motion of the energy treatment tool, the control unit 96 changes the specific time width W to a large width. This makes it possible to generate an appropriate second synchronization signal in consideration of the influence of noise on the first synchronization signal due to the operation of the energy processing tool.

OTHER EMBODIMENTS

While the above is description of the modes for carrying out the present disclosure, the present disclosure should not be limited by only the embodiment described above.

In the above-described embodiment, the medical control device according to the present disclosure is mounted on the medical observation system 1 having the insertion unit 2 formed with a rigid endoscope, but the configuration is not limited thereto. For example, the medical control device according to the present disclosure may be mounted on a medical observation system having the insertion unit 2 formed with a flexible endoscope. In addition, the medical control device according to the present disclosure may be mounted on a medical observation system such as a surgical microscope (refer to JP 2016-42981 A, for example) that enlarges and observes a predetermined field of view inside a living body or on a surface of a living body.

The following configurations also belong to the technical scope of the present disclosure.

(1) A medical control device including: a first clock generation unit configured to generate a first clock; a first synchronization signal generation unit configured to generate a first synchronization signal based on the first clock; a second clock generation unit configured to generate a second clock; and a second synchronization signal generation unit configured to generate a second synchronization signal for operating the medical observation device based on the first synchronization signal and the second clock, wherein the second synchronization signal generation unit is configured to individually execute: a first setting process of setting a transition timing at which the second synchronization signal transitions in correspondence with a transition of the first synchronization signal at a first transition timing, being an initial timing, of the input first synchronization signal; and a second setting process of setting a transition timing at which the second synchronization signal transitions in correspondence with a transition of the first synchronization signal at a second transition timing, being a second or subsequent timing, of the first synchronization signal, the first setting process performs setting of a transition timing at which the second synchronization signal transitions in correspondence with the transition of the first synchronization signal at the first transition timing by switching the first transition timing to a transition timing of the second clock, and the second setting process performs setting of a transition timing at which the second synchronization signal transitions in correspondence with the transition of the first synchronization signal at the second transition timing based on a position on a time axis of the second transition timing.

(2) The medical control device according to (1), wherein the second synchronization signal generation unit is configured to determine, in the second setting process, whether the position of the second transition timing on the time axis is located within a specific time width centered on a reference timing corresponding to a cycle of the first synchronization signal, and based on the determination result, set the transition timing at which the second synchronization signal transitions in correspondence with the transition of the first synchronization signal at the second transition timing.

(3) The medical control device according to (2), wherein when the second synchronization signal generation unit has determined, in the second setting process, that the position on the time axis of the second transition timing is located within the specific time width, the second synchronization signal generation unit is configured to set the transition timing at which the second synchronization signal transitions in correspondence with the transition of the first synchronization signal at the second transition timing based on a count value of the second clock counted from a transition timing immediately before the second synchronization signal.

(4) The medical control device according to (2) or (3), wherein when the second synchronization signal generation unit has determined, in the second setting process, that the position on the time axis of the second transition timing is not located within the specific time width but is located after the specific time width, the second synchronization signal generation unit is configured to set the transition timing at which the second synchronization signal transitions in correspondence with the transition of the first synchronization signal at the second transition timing by switching the second transition timing to the transition timing of the second clock.

(5) The medical control device according to any one of (2) to (4), wherein when the second synchronization signal generation unit has determined, in the second setting process, that the position on the time axis of the second transition timing is not located within the specific time width but is located before the specific time width, the second synchronization signal generation unit is configured not to transition the second synchronization signal in correspondence with the transition of the first synchronization signal at the second transition timing.

(6) The medical control device according to any one of (2) to (5), wherein when the second synchronization signal generation unit has determined, in the second setting process, that there is a plurality of the second transition timing, positions on the time axis of a part of the second transition timings are not located within the specific time width but are located before the specific time width, and positions on the time axis of another second transition timing is located within the specific time width, the second synchronization signal generation unit is configured to set the transition timing at which the second synchronization signal transitions in correspondence with the transition of the first synchronization signal at the second transition timing located within the specific time width, based on a count value of the second clock counted from a transition timing immediately before the second synchronization signal.

(7) The medical control device according to any one of (2) to (6), further including an input unit configured to receive a user operation, wherein the specific time width is to be variable according to the user operation on the input unit.

(8) The medical control device according to any one of (2) to (7), further including: a motion detector configured to detect a motion of an energy treatment tool; and a time width changer configured to change the specific time width to a large value when the motion detector has detected the motion of the energy treatment tool.

(9) A medical observation system including: a medical observation device configured to capture a subject image to generate a captured image; and a medical control device configured to control operations of the medical observation device, wherein the medical control device includes: a first clock generation unit configured to generate a first clock; a first synchronization signal generation unit configured to generate a first synchronization signal based on the first clock; a second clock generation unit configured to generate a second clock different from the first clock; and a second synchronization signal generation unit configured to generate a second synchronization signal for operating the medical observation device based on the first synchronization signal and the second clock, the second synchronization signal generation unit is configured to individually execute: a first setting process of setting a transition timing at which the second synchronization signal transitions in correspondence with a transition of the first synchronization signal at a first transition timing, being an initial timing, of the input first synchronization signal; and a second setting process of setting a transition timing at which the second synchronization signal transitions in correspondence with a transition of the first synchronization signal at a second transition timing, being a second or subsequent timing, of the first synchronization signal, the first setting process performs setting of a transition timing at which the second synchronization signal transitions in correspondence with the transition of the first synchronization signal at the first transition timing by switching the first transition timing to a transition timing of the second clock, and the second setting process performs setting of a transition timing at which the second synchronization signal transitions in correspondence with the transition of the first synchronization signal at the second transition timing based on a position on a time axis of the second transition timing.

With the medical control device and the medical observation system according to the present disclosure, it is possible to suppress the occurrence of metastability with a simple configuration.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A medical control device comprising:
    a first clock generation circuit configured to generate a first clock;
    a first synchronization signal generation circuit configured to generate a first synchronization signal based on the first clock;
    a second clock generation circuit configured to generate a second clock; and
    a second synchronization signal generation circuit configured to generate a second synchronization signal for operating a medical observation device based on the first synchronization signal and the second clock,
    wherein the second synchronization signal generation circuit is configured to individually execute:
        a first setting process of setting a transition timing at which the second synchronization signal transitions in correspondence with a transition of the first synchronization signal at a first transition timing, being an initial timing, of the input first synchronization signal; and
        a second setting process of setting a transition timing at which the second synchronization signal transitions in correspondence with a transition of the first synchronization signal at a second transition timing, being a second or subsequent timing, of the first synchronization signal,
    the first setting process performs setting of a transition timing at which the second synchronization signal transitions in correspondence with the transition of the first synchronization signal at the first transition timing by switching the first transition timing to a transition timing of the second clock,
    the second setting process performs setting of a transition timing at which the second synchronization signal transitions in correspondence with the transition of the first synchronization signal at the second transition timing based on a position on a time axis of the second transition timing,
    determine, in the second setting process, whether the position of the second transition timing on the time axis is located within a specific time width centered on a reference timing corresponding to a cycle of the first synchronization signal, and
    based on the determination result, set the transition timing at which the second synchronization signal transitions in correspondence with the transition of the first synchronization signal at the second transition timing.

2. The medical control device according to claim 1, wherein when the second synchronization signal generation circuit has determined, in the second setting process, that the position on the time axis of the second transition timing is located within the specific time width, the second synchronization signal generation circuit is configured to set the transition timing at which the second synchronization signal transitions in correspondence with the transition of the first synchronization signal at the second transition timing based on a count value of the second clock counted from a transition timing immediately before the second synchronization signal.

3. The medical control device according to claim 1, wherein when the second synchronization signal generation circuit has determined, in the second setting process, that the position on the time axis of the second transition timing is not located within the specific time width but is located after the specific time width, the second synchronization signal generation unit is configured to set the transition timing at which the second synchronization signal transitions in correspondence with the transition of the first synchronization signal at the second transition timing by switching the second transition timing to the transition timing of the second clock.

4. The medical control device according to claim 1, wherein when the second synchronization signal generation circuit has determined, in the second setting process, that the position on the time axis of the second transition timing is not located within the specific time width but is located before the specific time width, the second synchronization signal generation circuit is configured not to transition the second synchronization signal in correspondence with the transition of the first synchronization signal at the second transition timing.

5. The medical control device according to claim 1, wherein when the second synchronization signal generation circuit has determined, in the second setting process, that there is a plurality of the second transition timing, positions on the time axis of a part of the second transition timings are not located within the specific time width but are located before the specific time width, and positions on the time axis of another second transition timing is located within the specific time width, the second synchronization signal generation circuit is configured to set the transition timing at which the second synchronization signal transitions in correspondence with the transition of the first synchronization signal at the second transition timing located within the specific time width, based on a count value of the second clock counted from a transition timing immediately before the second synchronization signal.

6. The medical control device according to claim 1, further comprising an input circuit configured to receive a user operation,
wherein the specific time width is set based on the user operation on the input circuit.

7. The medical control device according to claim 1, further comprising:
a motion detector configured to detect a motion of an energy treatment tool; and
a time width changer configured to change the specific time width to a large value when the motion detector has detected the motion of the energy treatment tool.

8. A medical observation system comprising:
a medical observation device configured to capture a subject image to generate a captured image; and
a medical control device configured to control operations of the medical observation device,
wherein the medical control device includes:
a first clock generation circuit configured to generate a first clock;
a first synchronization signal generation circuit configured to generate a first synchronization signal based on the first clock;
a second clock generation unit configured to generate a second clock different from the first clock; and
a second synchronization signal generation circuit configured to generate a second synchronization signal for operating the medical observation device based on the first synchronization signal and the second clock,
the second synchronization signal generation circuit is configured to individually execute:
a first setting process of setting a transition timing at which the second synchronization signal transitions in correspondence with a transition of the first synchronization signal at a first transition timing, being an initial timing, of the input first synchronization signal; and
a second setting process of setting a transition timing at which the second synchronization signal transitions in correspondence with a transition of the first synchronization signal at a second transition timing, being a second or subsequent timing, of the first synchronization signal,
the first setting process performs setting of a transition timing at which the second synchronization signal transitions in correspondence with the transition of the first synchronization signal at the first transition timing by switching the first transition timing to a transition timing of the second clock,
the second setting process performs setting of a transition timing at which the second synchronization signal transitions in correspondence with the transition of the first synchronization signal at the second transition timing based on a position on a time axis of the second transition timing,
determine, in the second setting process, whether the position of the second transition timing on the time axis is located within a specific time width centered on a reference timing corresponding to a cycle of the first synchronization signal, and
based on the determination result, set the transition timing at which the second synchronization signal transitions in correspondence with the transition of the first synchronization signal at the second transition timing.

9. The medical observation system according to claim 8, wherein when the second synchronization signal generation circuit has determined, in the second setting process, that the position on the time axis of the second transition timing is located within the specific time width, the second synchronization signal generation circuit is configured to set the transition timing at which the second synchronization signal transitions in correspondence with the transition of the first synchronization signal at the second transition timing based on a count value of the second clock counted from a transition timing immediately before the second synchronization signal.

10. The medical observation system according to claim 8, wherein when the second synchronization signal generation circuit has determined, in the second setting process, that the position on the time axis of the second transition timing is not located within the specific time width but is located after the specific time width, the second synchronization signal generation unit is configured to set the transition timing at which the second synchronization signal transitions in correspondence with the transition of the first synchronization signal at the second transition timing by switching the second transition timing to the transition timing of the second clock.

11. The medical observation system according to claim 8, wherein when the second synchronization signal generation circuit has determined, in the second setting process, that the position on the time axis of the second transition timing is not located within the specific time width but is located before the specific time width, the second synchronization signal generation circuit is configured not to transition the second synchronization signal in correspondence with the transition of the first synchronization signal at the second transition timing.

12. The medical observation system according to claim 8, wherein when the second synchronization signal generation circuit has determined, in the second setting process, that there is a plurality of the second transition timing, positions on the time axis of a part of the second transition timings are not located within the specific time width but are located before the specific time width, and positions on the time axis of another second transition timing is located within the specific time width, the second synchronization signal generation circuit is configured to set the transition timing at which the second synchronization signal transitions in correspondence with the transition of the first synchronization signal at the second transition timing located within the specific time width, based on a count value of the second clock counted from a transition timing immediately before the second synchronization signal.

13. The medical observation system according to claim 8, further comprising:
a motion detector configured to detect a motion of an energy treatment tool; and
a time width changer configured to change the specific time width to a large value when the motion detector has detected the motion of the energy treatment tool.

14. A non-transitory computer readable storage device having computer readable instructions that when executed by circuitry cause the circuitry to:
generate a first clock;
generate a first synchronization signal based on the first clock;
generate a second clock; and
generate a second synchronization signal for operating a medical observation device based on the first synchronization signal and the second clock,
wherein to generate the second synchronization signal includes individually executing:
a first setting process of setting a transition timing at which the second synchronization signal transitions in correspondence with a transition of the first synchronization signal at a first transition timing, being an initial timing, of the input first synchronization signal; and
a second setting process of setting a transition timing at which the second synchronization signal transitions in correspondence with a transition of the first synchronization signal at a second transition timing, being a second or subsequent timing, of the first synchronization signal,
the first setting process performs setting of a transition timing at which the second synchronization signal transitions in correspondence with the transition of the first synchronization signal at the first transition timing by switching the first transition timing to a transition timing of the second clock, the second setting process performs setting of a transition timing at which the second synchronization signal transitions in correspondence with the transition of the first synchronization signal at the second transition timing based on a position on a time axis of the second transition timing,
determine, in the second setting process, whether the position of the second transition timing on the time axis is located within a specific time width centered on a reference timing corresponding to a cycle of the first synchronization signal, and
based on the determination result, set the transition timing at which the second synchronization signal transitions in correspondence with the transition of the first synchronization signal at the second transition timing.

15. The non-transitory computer readable storage device according to claim 14, wherein the circuitry is further caused to:
determine a position of the second transition timing on the time axis, and when the position on the time axis of the second transition timing is located within the specific time width, set the transition timing at which the second synchronization signal transitions in correspondence with the transition of the first synchronization signal at the second transition timing based on a count value of the second clock counted from a transition timing immediately before the second synchronization signal.

16. The non-transitory computer readable storage device according to claim 14, wherein the circuitry is further caused to:
determine a position of the second transition timing on the time axis, and
when the position on the time axis of the second transition timing is not located within the specific time width but is located after the specific time width, set the transition timing at which the second synchronization signal transitions in correspondence with the transition of the first synchronization signal at the second transition timing by switching the second transition timing to the transition timing of the second clock.

17. The non-transitory computer readable storage device according to claim 14, wherein the circuitry is further caused to:
determine a position of the second transition timing on the time axis, and
when the position on the time axis of the second transition timing is not located within the specific time width but is located before the specific time width, not to transition the second synchronization signal in correspondence with the transition of the first synchronization signal at the second transition timing.

18. The non-transitory computer readable storage device according to claim 14, wherein, when there are a plurality of the second transition timings, the circuitry is further caused to:
determine positions of each of the plurality of second transition timings on the time axis, and
when positions on the time axis of a first one of the plurality of second transition timings is not located within the specific time width but are located before the specific time width, and positions on the time axis of a second one of the plurality of second transition timings is located within the specific time width, set the transition timing at which the second synchronization signal transitions in correspondence with the transition of the first synchronization signal at the second transition timing located within the specific time width, based on a count value of the second clock counted from a transition timing immediately before the second synchronization signal.

19. The non-transitory computer readable storage device according to claim 14, wherein circuitry is configured to set a specific time width is based on a user operation.

20. The non-transitory computer readable storage device according to claim 14, wherein the circuitry is caused to increase the specific time width when motion of an energy treatment tool is detected.

* * * * *